Jan. 19, 1943. J. R. HARTLEY 2,308,923
PRESSURE RELAY UNIT
Filed Sept. 5, 1941 4 Sheets-Sheet 1

JOHN R. HARTLEY
INVENTOR.

BY *[signature]*
ATTORNEY

Jan. 19, 1943.   J. R. HARTLEY   2,308,923
PRESSURE RELAY UNIT
Filed Sept. 5, 1941   4 Sheets-Sheet 2
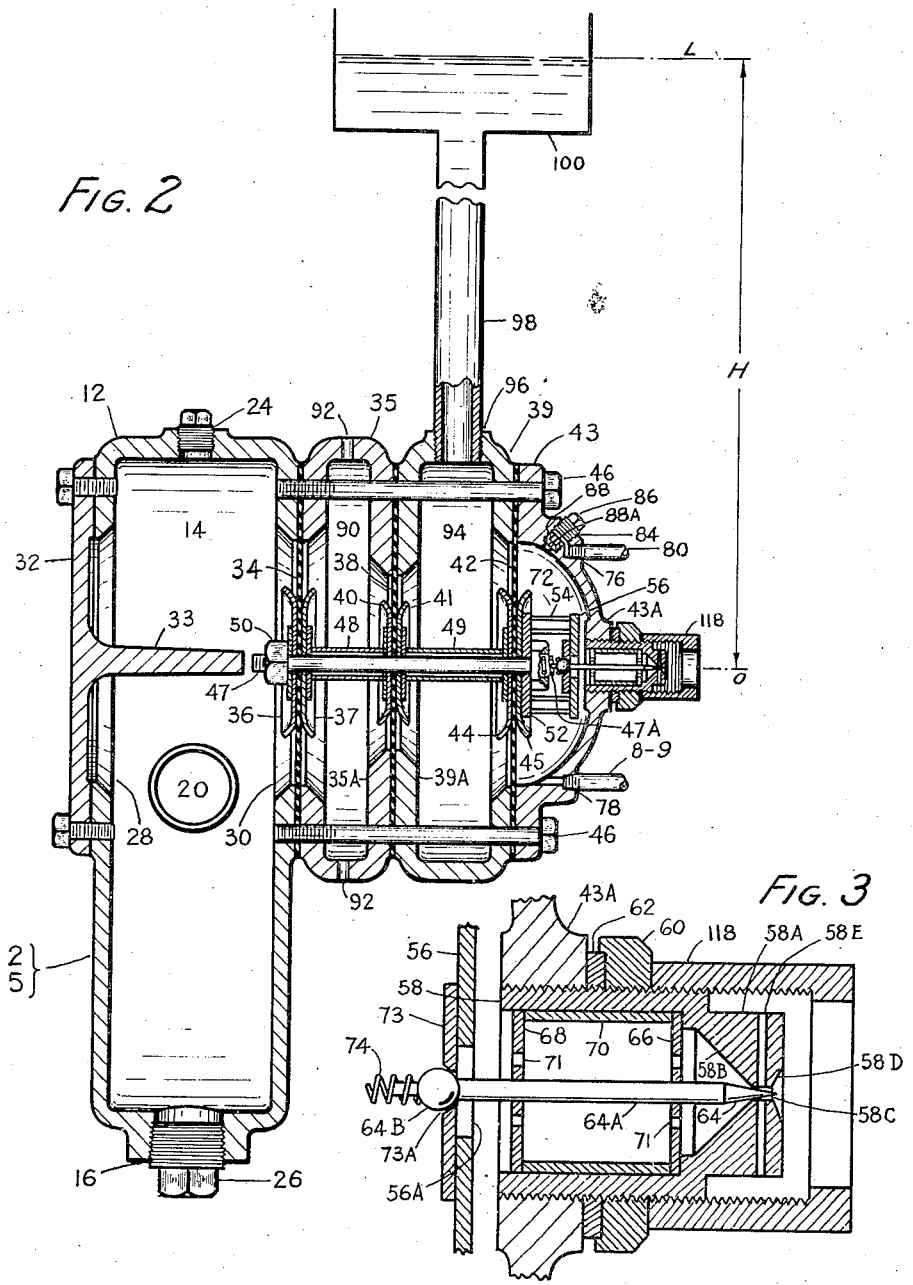
JOHN R. HARTLEY
INVENTOR
ATTORNEY Jan. 19, 1943.    J. R. HARTLEY    2,308,923
PRESSURE RELAY UNIT
Filed Sept. 5, 1941    4 Sheets-Sheet 3

JOHN R. HARTLEY
INVENTOR
BY
ATTORNEY

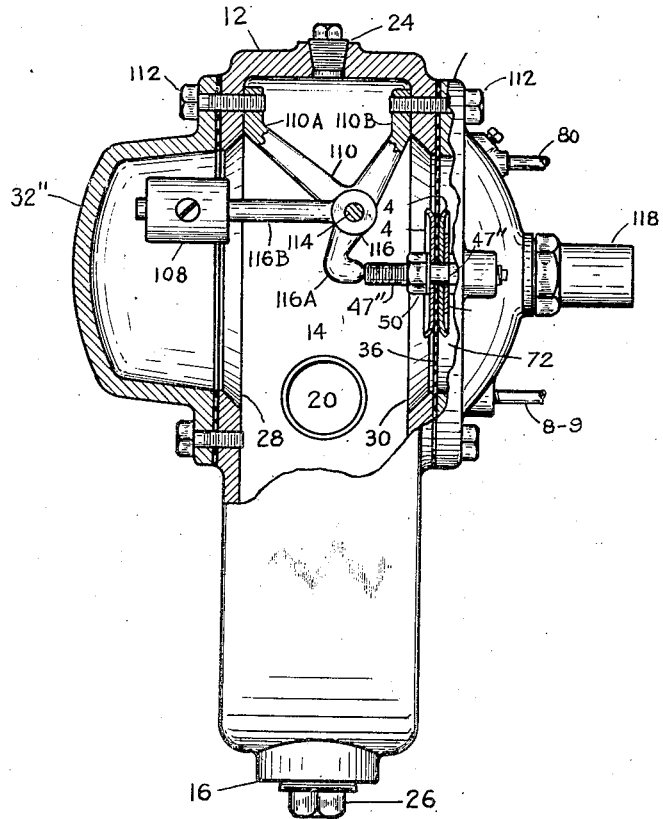

Patented Jan. 19, 1943

2,308,923

UNITED STATES PATENT OFFICE 2,308,923

PRESSURE RELAY UNIT

John R. Hartley, Barrington, R. I., assignor to Builders Iron Foundry, Providence, R. I., a corporation of Rhode Island Application September 5, 1941, Serial No. 409,675

5 Claims. (Cl. 137—78)

This invention relates to improvements in a pressure relay unit. More especially it is particularly directed to a system for transmitting separately to a remote pressure responsive device, pressures corresponding to the characteristic pressures occasioned by the flow of a fluid through a Venturi section or similar means where one of such characteristic pressures may be below that of the atmosphere. This application is a continuation in part of my application Serial No. 234,073 filed October 8, 1938, now Patent No. 2,265,114, granted Dec. 2, 1941.

Not infrequently where the flow through a Venturi section or the like is brought about by means located beyond in the direction of flow, one of the characteristic pressures may be below atmospheric pressure. I shall hereinafter call such a pressure a negative one. When a negative pressure is produced it is not always feasible to transmit it to a pressure responsive device nor is it entirely satisfactory in many instances to transmit the differential between a positive pressure and a negative one. Very often it is objectionable to utilize the flowing fluid as the pressure transmitting medium in any event as, for example when it is a gas or liquid that is inflammable, corrosive or toxic. Such a fluid should preferably not be removed from its conduit any farther than is necessary to utilize it as a controlling medium for determining the intensity of some other fluid, such as air for example, which may safely and conveniently be employed as a pressure transmitting agency.

It is among the objects of this invention to provide a system and a novel relay unit therefor whereby the characteristic pressures associated with a Venturi section or equivalent device may be employed as separate controlling pressures for governing the pressures of another fluid which are to be separately transmitted to a remote pressure responsive device. It is a feature of my invention that both transmitted pressures shall always be positive, even though one of the controlling pressures may be negative. By thus providing for the transmission of two different positive pressures to some pressure responsive device, the action or response of the latter is more alertly sensitive than if the differential of the controlling pressures is alone utilized for transmission, and by selecting a suitable transmitting fluid the pressure responsive device may be located at a distance from the Venturi section at a point which is not limited by the hydraulic gradient or the viscosity of a liquid flowing through the conduit.

The best mode in which I have contemplated applying the principles of my invention is shown in the accompanying drawings but these are to be taken as merely illustrative because it is intended that the patent shall cover by suitable expression in the appended claims whatever features of patentable novelty are herein disclosed.

In the accompanying drawings:

Figure 2 is a vertical section, taken as on line 2—2 of Figure 4, showing the preferred form of a relay unit for use in my improved system;

Figure 3 is a vertical section on larger scale, showing certain details of the relay unit;

Figure 6 is another vertical section, such as might be taken on line 2—2 of Figure 4, but showing still another modified form of relay unit.

Figure 1:
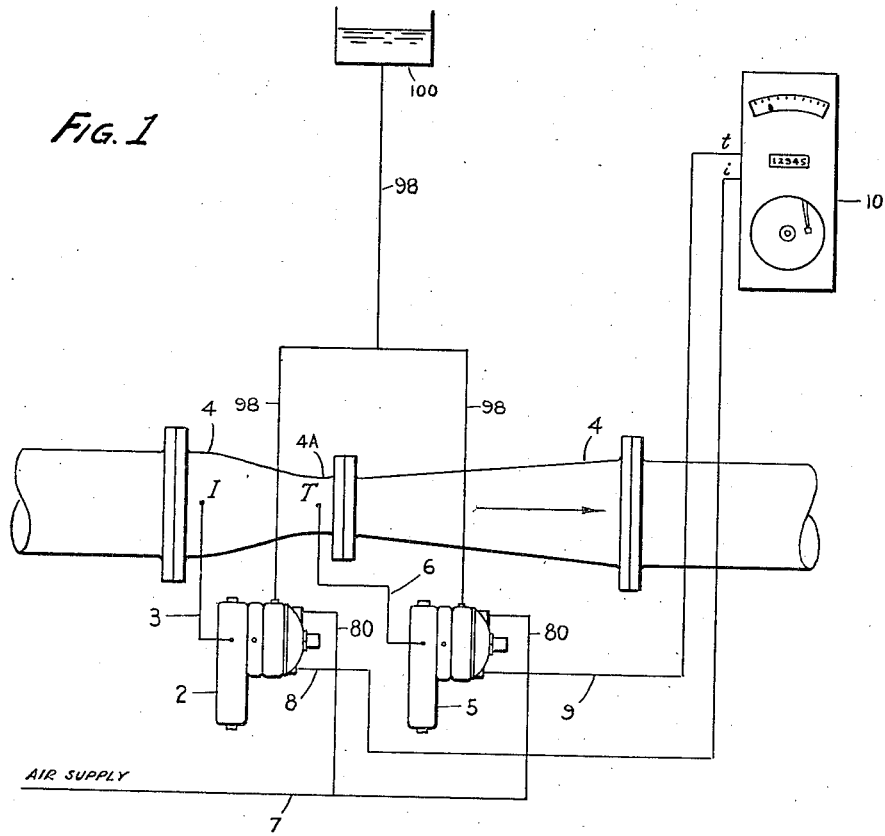
Figure 1 is a somewhat diagrammatic elevation showing a system embodying my invention.
Figure 4:
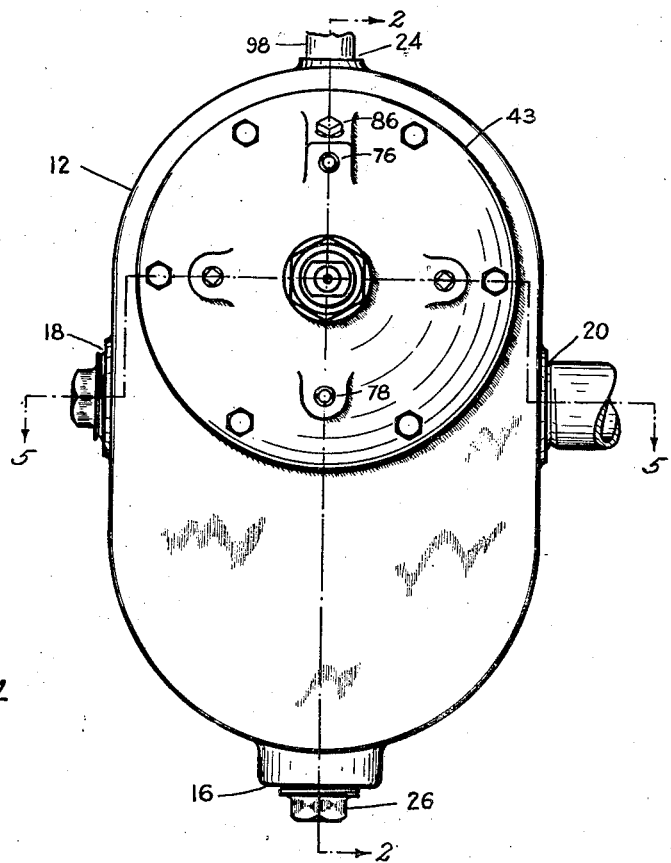
Figure 4 is an elevation of the relay unit as seen from the right of Figure 2.

The conduit through which the fluid passes whose flow is to be measured, recorded or controlled, comprises a Venturi section or some equivalent device such as a baffle or orifice plate, whereby characteristic pressures of the flowing fluid are produced. In a Venturi section the normal cross-sectional area of flow is gradually reduced to some predetermined area, usually called the throat, and then gradually restored to normal again. Since the same volume of fluid must flow through the entire Venturi section, it follows that the rate of flow is greatest at the throat or cross section of smallest area. If a branch pipe is connected to the conduit where its flow area is normal, and this branch pipe is connected to a pressure gauge, a certain static pressure of the flowing fluid will be indicated. If a similar branch pipe is extended from the throat of the Venturi section or from where the area of flow is greatly reduced, and connected to another pressure gauge, a lower static pressure will be indicated. By familiar computations based upon the difference between these static pressures, the volume and rate of flow of the flowing fluid can readily be determined. Likewise by transmitting these different pressures or their differential to suitably designed and calibrated instruments certain desired information concerning the flow may be indicated or recorded or an instrument may be actuated to effect the control of the flow through the conduit or do other useful things.

Under certain conditions the static pressure at the throat may become negative, that is below the pressure of the atmosphere. When this condition is encountered it is not always feasible to transmit the negative pressure directly nor is it always possible to transmit satisfactorily the differential between such a negative pressure and the positive static pressure at the normal flow area of the conduit. It is for such conditions that my improved system has been particularly designed and it is a feature thereof that both the positive and the negative static pressures of the flowing fluid are used separately as controlling pressures for determining the intensities of separate positive transmitting pressures for affecting a remote pressure responsive device for any desired purpose.

One of my improved relay units 2 is connected by a branch pipe 3 with a Venturi section 4 where the flow area is of normal cross section and another such unit 5 is connected by another branch pipe 6 with the throat 4A of the Venturi section where the flow area is materially reduced in cross section. Thus the characteristic static pressures of the flowing fluid as produced by the Venturi section are separately imposed on the respective relay units. Both of the latter are connected to a source of positive pressure, for example to an air line 7 in which air above atmospheric pressure is always available. Each relay unit is also separately connected by pipes 8 and 9 respectively to a remote pressure responsive device 10, so constructed and arranged as to be sensitive to both pressures and actuated in accordance with the differential between them. By means to be presently described, each relay unit effects the transmission to the pressure responsive device of a positive pressure which has a proportional relation to the controlling static pressure imposed on the unit by the fluid from the Venturi section, whether this controlling pressure is itself positive or negative. Accordingly, the action of the pressure responsive device is alertly sensitive to any pressure changes in the flowing fluid and will cause the device to respond promptly and accurately in accordance with such changes.

Referring now more particularly to Figure 2, the preferred form of novel relay unit has a body casing 12 forming a chamber 14 having a bottom outlet opening 16, opposed side outlet openings 18 and 20, and a top outlet opening 24. The fluid whose pressure is to control the action of the unit is preferably admitted to the chamber 14 through one or both of the side openings. Any dirt, sediment or other foreign particles in the fluid entering the chamber can settle to the bottom of the casing and when desired can be washed out by removing a plug 26 from the bottom opening and forcing a scavenging fluid into the chamber through the top opening 24.

In the upper portion of the casing, in both the front and back walls, are relatively large openings 28 and 30. One of these is closed by a cover member 32 having at its center a stem 33 extending toward the other large opening. The latter is closed by a flexible diaphragm 34 of rubber or other suitable material, whose outer edge is clamped between the body casing 12 and an intermediate casing member 35 and also between a pair of reinforcing plates 36 and 37. A second diaphragm 38 is clamped between the intermediate member 35 and a similar intermediate member 39 and between reinforcing plates 40 and 41. A third diaphragm 42 is clamped between the intermediate member 39 and a cover member 43 and between reinforcing plates 44 and 45. The effective areas on both sides of the end diaphragms 34 and 42 are preferably the same while the effective areas on both sides of the middle diaphragm 38 are smaller because the intermediate members have inwardly extending portions 35A and 39A.

Elongated bolts 46 clamp the cover member and the intermediate members to the body casing and a long bolt 47 projects through the several reinforcing plates, the three diaphragms, and through spacing sleeves 48 and 49, and in cooperation with a nut 50 clamps the several plates, sleeves and diaphragms securely together. The shank of the bolt 47 and the stem 33 on the cover plate are in alignment and make contact with one another to limit the movement of the diaphragms in one direction. Secured to diaphragm 42 by the bolt 47 is a base plate 52, having a series of separated arms 54 to which is attached a disk 56 having a hole 56A at its center. (See Fig. 3). Contact between this disk 56 and the hub 43A of the cover member limits the movement of the diaphragms in the other direction.

Referring now particularly to Fig. 3, an externally threaded hollow plug 58 is screwed into the hub 43A and locked thereto by a nut 60 there being a suitable packing ring 62 provided to insure against the leakage of any pressure. The somewhat reduced end 58A of the plug is provided with an internal tapered surface 58B terminating in a relatively small axial vent hole 58C from which an external tapered surface 58D extends to the end face of the plug. Radial holes 58E are provided from the cylindrical hole 58C to augment the escape passage and insure no restricting effect other than that imposed by the vent valve 64.

This valve 64 is formed by a relatively long tapered end on a valve stem 64A which passes through guide plates 66 and 68 pressed tightly within the plug 58 with a spacing sleeve 70 between them. These guide plates are provided with holes 71 to permit fluid to pass from chamber 72 to the vent opening 58C. The valve stem 64A projects through the hole 56A of the disk 56 and through a hole 73A of a smaller disk 73. The latter hole has a tapered surface to provide a seat for a ball portion 64B of the valve stem, upon which portion one end of a small spring 74 rests. The other end of the spring rests in a recess 47A in the head of bolt 47. Wherever the valve 64 is not tight in the vent hole 58C, the spring 74 keeps the ball against its seat on disk 73 and keeps the latter against the disk 56, but when the valve closes the vent hole, then upon any further movement of the diaphragms toward the hub 43A of the cover the spring 74 yields to prevent damage to either the tapered surface of the valve 64 or to the seating edge of the vent hole 58C.

On opposite sides of the cover member 43 are tapped openings 76 and 78. To one of them (76) is connected a pipe 80 leading from a supply of fluid under pressure (the line 7 of Fig. 1), and to the other opening (78) is connected a pipe (8—9) leading to some pressure responsive device (10) located at a distance from the relay unit. Adjacent the opening 76, and connected thereto within the wall of the cover member is another opening 84 whose outer end is closed by a plug 86. The inner end has a tapped wall to receive a restriction plug 88 having a smaller orifice 88A. The size of this orifice limits the rate of flow of the fluid under pressure from pipe 80 to the chamber 72.

The chamber 90 formed between diaphragms 34 and 38 is open to the atmosphere through vents 92, and therefore the pressure in this chamber is always atmospheric. The chamber 94 formed between diaphragms 38 and 42 is closed except for an opening 96 to which is connected a pipe 98 leading to a reservoir 100 open to atmosphere. A suitable liquid fills the chamber 94 and the pipe 98 and stands at some predetermined level L in the reservoir at some predetermined height H above the axial line O of the several diaphragms. Accordingly, the pressure in chamber 94 will always be in excess of atmospheric pressure due to the head of the liquid. Although I have shown an open reservoir and liquid in it and the chamber 94, the latter may be maintained at some pressure above atmosphere in any other suitable manner.

For purposes of illustrating the operation of my apparatus, let us assume that the relay unit (5) is connected to the throat of the Venturi section and that the static pressure in the throat is a negative pressure of say one pound per square inch below atmospheric pressure. This will be the controlling pressure in chamber 14 acting on one side of the diaphragm 34. The other side of this same diaphragm will be under the atmospheric pressure existing in chamber 90. In chamber 94 the pressure is to be maintained at say three pounds per square inch above atmospheric pressure, this being accomplished by keeping the liquid in reservoir 100 at the proper height to maintain this intensity of pressure. Assume for the moment that the pressure supply to chamber 72 through the restricted inlet 88A is shut off and that this chamber is under only atmospheric pressure. Let us further assume that the atmospheric pressure is 15 pounds, that the effective areas of diaphragms 34 and 42 are 10 square inches and that the effective areas of diaphragm 38 is 5 square inches.

The total pressure acting on the left side of diaphragm 34 is $14 \times 10 = 140$ pounds, while the total pressure on its opposite side is $15 \times 10 = 150$ pounds. That is, an effective force of 10 pounds is acting on diaphragm 34 tending to flex it to the left. On one side of the intermediate diaphragm 38 is a total pressure of $15 \times 5 = 75$ pounds and on the other side is a total pressure of $18 \times 5 = 90$ pounds. Therefore an effective force of 15 pounds is acting on diaphragms 38 tending to move it to the left also. The third diaphragm 42 is subjected to a total pressure of $18 \times 10 = 180$ pounds on one side and a total pressure of $15 \times 10 = 150$ pounds on the opposite side. Therefore, the effective force acting on diaphragm 42 is 30 pounds tending to move it to the right. Accordingly the net effective force acting on all three diaphragms is 30—15—10 or 5 pounds tending to move all of them to the right. Under such assumed conditions the diaphragms will flex to the right and cause valve 64 to close the vent hole 58C and the disk 56 to seat on the hub 43A of the cover, the spring 74 yielding as hereinbefore described.

Let the supply pressure be now admitted through pipe 80 and the restricted inlet 88A to build up a transmitting pressure in chamber 72, the pipe 9 and in the remote pressure responsive device 10 to which the latter is connected. When this pressure slightly exceeds a pressure of ½ pound per square inch above atmospheric or 15.5+ pounds, the resulting total pressure on the right side of diaphragm 42 will be $10 \times 15.5+ = 155+$ pounds. Since the opposing total pressure on this same diaphragm in chamber 94 is 180 pounds, the effective force on the diaphragm 42 is 25— pounds tending to move it to the right. This reduced effective force will be overcome by the effective forces of 15 plus 10 pounds acting on diaphragms 34 and 38 and cause the several diaphragms and associated movable parts to move toward the left. When this occurs the valve 64 is moved to open the vent 58C and pressure will thereupon begin to escape from chamber 72. When the rate of this escape is sufficient to establish in chamber 72 a pressure of 15.5 pounds, the effective forces acting on the several diaphragms will be in substantial balance with the diaphragms in some such positions as are shown in Fig. 2. If the controlling pressure in chamber 14 falls, the diaphragms will flex further to the left and cause valve 64 to move away from vent hole 58C thus further increasing the size of the escape passage so that the pressure in chamber 72 will decrease in proportion to the reduction of pressure in chamber 14. If the controlling pressure in chamber 14 increases, the diaphragms will flex to the right, cause valve 64 to reduce the size of the escape passage and thereby effect an increase of the pressure in chamber 72 in proportion to the increase in the controlling pressure. Thus whatever change occurs in the controlling pressure in chamber 14, the action of the unit establishes a corresponding proportional pressure change in chamber 72 which is transmitted to the pressure responsive device 10.

Thus far, I have assumed that the controlling pressure in the body casing chamber is a negative one, but the action of the unit is not altered if this controlling pressure becomes a positive one, that is, a pressure greater than atmospheric pressure. This can best be understood, perhaps, by assuming algebraic values and working out a representative equation. Let it be assumed that the effective area on each side of diaphragm 34, and on each side of diaphragm 42, is A, and that the smaller effective area on each side of the intermediate diaphragm 38 is $a$. Let the controlling pressure per unit of area in chamber 14 be $Pc$, let the atmospheric pressure per unit of area be $Pa$, let the mean hydraulic pressure per unit of area in chamber 94 due to the head H of liquid in reservoir 100 be $Ph$, and let the transmitting pressure in the chamber 72, between diaphragm 42 and the cover member 43, be $Pt$ per unit of area. Taking all these assumed pressures and the atmospheric pressure into account, we can write an equation of pressures, putting on the left side of the equation the pressures acting toward the left and putting on the right side of the equation the pressures acting toward the right, thus:

$$(Pt+Pa)A + (Ph+Pa)a + Pa \times A = (Pc+Pa)A + Pa \times a + (Ph+Pa)A$$

By algebraic treatment this equation reduces to $$Pt = Pc + Ph\left(1 - \frac{a}{A}\right)$$

In other words, the transmitting pressure $Pt$ maintained on the right side of diaphragm 42 is equal to the controlling pressure $Pc$ in chamber 14 plus the mean hydraulic pressure $Ph$ in chamber 94 times a constant. By maintaining the liquid in reservoir 100 at a constant level, thus making the height H and the mean hydraulic pressure $Ph$ also a constant, we finally reach the relation that the transmitting pressure $Pt$ is equal to the controlling pressure $Pc$ plus a constant, thus:

$$Pt = Pc + K$$

Accordingly if the controlling pressure $Pc$ is a positive one then the transmitting pressure $Pt$ will also be a positive one, and if the controlling pressure $Pc$ is a negative one then by providing that the constant K shall always be greater numerically than any such negative controlling pressure which may occur, the transmitting pressure $Pt$ will always be a positive one. And, as already explained, any change of the controlling pressure will affect the vent opening from chamber 72 so that the transmitting pressure will vary proportionately in accordance with any variation of the controlling pressure.

From all of which it follows that the differential of the transmitting pressures effective on the pressure responsive device will be a positive one under any assumed conditions of flow through the Venturi section. Let the static pressure at the normal flow area of the section or the inlet pressure be I and let the corresponding transmitting pressure produced by relay unit 2 (Fig. 1) be $i$. Let the static pressure at the throat 4A or area of reduced cross section be T and the corresponding transmitting pressure produced in relay unit 5 be $t$. Since the transmitting pressures are always proportional to the controlling pressures, it follows that the differential between the transmitting pressure $i$ and the transmitting pressure $t$ will be equal to the differential between the inlet pressure I and the throat pressure T, thus $i-t=I-T$. Moreover, since each relay unit will always produce a positive transmitting pressure regardless of whether the controlling pressure is positive or negative, and since the loading pressure in chamber 94 of each unit 2 and 5 is the same, the differential between the transmitting pressure will always be a positive quantity and correctly actuate the pressure controlling device under any of the following assumed conditions where the positive or negative values of the pressures are indicated by the sub-letters $p$ and $n$.

(1)          $ip-tp=Ip-Tp$
(2)          $ip-tp=Ip-Tn$
(3)          $ip-tp=In-Tn$
(4)          $ip-tp=In-Tp$

The conditions indicated in equation 4 are not attainable in the Venturi section but nevertheless my system could be used where such conditions might be encountered.

Figure 5:
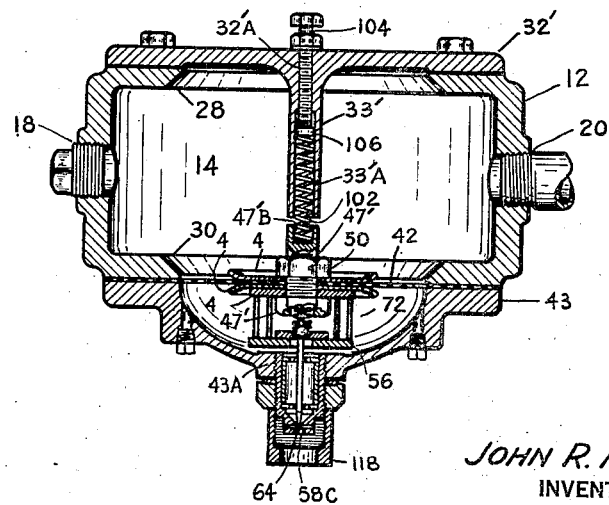
Figure 5 is a plan in section, such as might be taken on line 5—5, of Figure 4, but showing a modified form of relay unit.

In the modified form of relay unit shown in Fig. 5, the pre-loading force is provided by a spring instead of by hydraulic or other fluid pressure means as disclosed in Fig. 2. In this arrangement the intermediate casing members are dispensed with the cover member 43 is secured directly to the body casing member 12 with the one diaphragm 42 between the chambers 14 and 72. The cover member 32' has its stem 33' made with a cylindrical space 33'A to receive a pre-loading spring 102. The adjacent shank end of the bolt 47' is also provided with a recess 47'B to receive the same spring. The cover is also provided with a threaded hole 32'A extending to the cylindrical space 33'A within the stem and screwed into this hole is a screw 104 for adjusting a piston-like washer 106 against which the spring 102 may seat. By adjusting this screw, any predetermined force may be imposed on the diaphragm by the spring.

The operation of the embodiment of my invention particularly shown in Figure 5 will now be described. Assume that the fluid, whose pressure is to be the controlling one, is present in the large chamber 14 of the casing 12 and acting upon the diaphragm 42 with a pressure of one pound per square inch below atmospheric pressure. For such a negative pressure, the screw 104 may be adjusted so that the spring 102 exerts a force equivalent to a positive pressure of two pounds per square inch on the diaphragm. Thus the effective force acting on the diaphragm, tending to move it toward the vent 58C, is equal to a pressure of one pound per square inch above atmospheric pressure. Let the supply pressure be now admitted through pipe 80 and the restricted inlet 88A as in Fig. 2 to build up a transmitting pressure in chamber 72, the pipe 8—9 and in the remote pressure responsive device 10 to which the latter is connected. When this pressure slightly exceeds a pressure of one pound per square inch above atmospheric, the diaphragm 42 will flex toward chamber 14, moving the disk 56 away from the hub 43A and moving the valve 64 to open the vent 58C and permit the escape of pressure from chamber 72 until the effective transmitting pressure in this chamber equals the effective force acting on the diaphragm in chamber 14. This transmitting pressure will have a definite proportional relation to the controlling pressure.

To make this clear and keeping to our previous assumptions, let the controlling pressure per unit of area in chamber 14 be $Pc$, let the atmospheric pressure be $Pa$ per unit of area and let the transmitting pressure in chamber 72 be $Pt$ per unit of area. Let the force exerted by the spring 102 be $k$ which may be deemed a constant force. Let the effective area on both sides of the diaphragm be A. Again writing an equation we have $$(Pt+Pa)A+k=(Pc+Pa)A$$

Again by algebraic treatment this will reduce to $$Pt=Pc+K$$

Thus the effective force in chamber 72 will be equal to the effective force acting in chamber 14 on the diaphragm and the transmitting pressure will have a definite proportional relation to the controlling negative pressure in chamber 14. The pressure in chamber 72 will be transmitted through the connection 8—9 to the distant pressure responsive device 10. By suitable calibration of this device it will indicate the negative controlling pressure. Any variation in the latter will promptly affect the position of the diaphragm and the needle valve 64 and at once bring about a change in the transmitting pressure so that the latter will correspond to the controlling pressure.

In the embodiment of my invention shown in Fig. 6, the means for applying a pre-loading force utilizes a weight 108 instead of the spring 102 of Fig. 5. Within the casing 12 a pair of supports 110 (only one of which is shown) are provided, each having arms 110A and 110B, secured to the casing by clamping bolts 112. These supports carry a shaft or axle 114 about which a lever 116 may turn. This lever has one arm 116A arranged to make contact with the shank of bolt 47'' and has another arm 116B on which is adjustably mounted the weight 108. The latter arm and the weight may extend through the large opening 28 in the casing 12, in which event a cup-shaped cover plate 32'' is provided to give ample space for movement of the arm.

The weight 108 is adjusted along the arm 116B to effect the imposition of a force on the bolt 47'' in a direction tending to move the diaphragm toward the vent opening from chamber 72. Thus any desired positive force may be provided to augment the negative or controlling pressure of the fluid in chamber 14 so that the transmitting pressure in chamber 72 will always be something in excess of atmospheric pressure. Except for the positive force being applied by the weight 108 instead of the spring 102, the action of the unit shown in Fig. 6 is the same as that described in connection with Fig. 5.

Fig. 6 clearly shows a protector 118 which may be screwed onto the vent plug 58 to prevent anything striking the needle valve and to prevent dust from settling down in the vent opening 58C or the radial holes 58E.

A characteristic feature of my unit for transmitting pressure is that the controlling fluid is entirely sealed off from the transmitting fluid. This is of importance where the controlling fluid might be harmful to the ultimate pressure responsive device if admitted directly to it. It is a further feature that the position of the escape valve is determined by the controlling pressure and hence controls the balancing pressure very accurately and promptly. By using a gas such as air as the balancing pressure medium, the pressure transmitting portion of the system can be maintained clean with no danger of clogging or fouling regardless of the nature of the fluid whose pressure is controlling. And by providing a pre-loading force my system may be used to transmit positive pressures to the pressure responsive device regardless of whether the controlling pressures are positive or negative.

I claim:

1. A pressure transmitting relay unit for transmitting a positive pressure in accordance with a negative controlling pressure, comprising a chamber containing the controlling negative pressure, a second chamber connected to a source of pressure supply having a vent therefrom and having a connection for transmitting the pressure in said second chamber; pressure actuated means interposed between said chambers and responsive to the pressures therein for regulating escape of pressure through said vent and thereby the pressure transmitted in accordance with changes in the controlling pressure; and pre-loading means associated with said pressure actuated means for imposing a sufficient positive force on said pressure actuated means in opposition to said negative pressure to insure that the transmitted pressure from said second chamber will be maintained positive and proportional to changes of the controlling pressure.

2. A pressure transmitting relay unit comprising a casing having a chamber connected to a source of pressure below that of atmospheric pressure; a second chamber in said casing adapted to be connected to a source of pressure in excess of atmospheric pressure and to a pressure responsive device, pressure actuated means between said chambers separating them and subjected on opposite sides to the said respective pressures; means applying a positive force to said pressure actuated means to augment said negative pressure so that the effective force imposed on said pressure actuated means by the negative pressure and said applied force is in excess of atmospheric pressure; a vent from said second chamber; a valve member for said vent; and an operative connection between said valve and said pressure actuated means whereby the escape of pressure from second chamber through said vent is controlled by the said pressure actuated means to establish an effective pressure in said second chamber corresponding to the said effective force imposed on said pressure actuated means by the negative pressure and said applied force.

3. A pressure transmitting relay unit comprising a casing and a cover member therefor; a chamber containing a negative controlling pressure; a chamber in said member adapted to be connected to a source of positive pressure and to a pressure responsive device; a diaphragm between said chambers separating them and subjected on opposite sides to the said respective pressures; means applying a positive force to said diaphragm to augment said negative pressure; a vent from said cover chamber; a valve for said vent; and an operative connection between the diaphragm and said valve; the said diaphragm, force applying means and said valve being so arranged and organized that upon a change occurring in said negative controlling pressure said diaphragm is flexed to cause movement of said valve to control the escape of pressure through said vent and thereby produce an effective pressure in said cover chamber corresponding to the effective force exerted on the diaphragm by the negative controlling pressure and the said applied positive force.

4. A pressure transmitting relay unit for transmitting a positive pressure to a pressure responsive device in accordance with a separated controlling negative pressure, comprising a chamber containing said negative controlling pressure, a second chamber open to atmosphere and separated from the first said chamber by a diaphragm, a third chamber containing a predetermined positive pressure and separated from said second chamber by a diaphragm, a fourth chamber adapted to be connected to said pressure responsive device and to a source of positive pressure and separated from said third chamber by a diaphragm, a vent from said fourth chamber, a valve controlling said vent, means connecting said diaphragms together, and means actuated by said diaphragms for determining the position of said valve with respect to said vent; the position of said valve being determined by the combined effects of the pressures in the several chambers to permit a portion of the fluid pressure to escape from the fourth chamber whereby the effective fluid pressure in said fourth chamber, which is transmitted to the pressure responsive device, is proportional to the negative controlling pressure.

5. A pressure transmitting relay unit for transmitting pressure from a source of fluid under positive pressure to a pressure responsive device in accordance with a separated controlling negative pressure, comprising a chamber containing said negative controlling pressure, a second chamber open to atmosphere and separated from the first said chamber by a diaphragm, a third chamber containing a liquid under a predetermined hydraulic head and separated from said second chamber by a diaphragm, a fourth chamber adapted to be connected to said pressure responsive device and to said source of fluid under positive pressure and separated from said third chamber by a diaphragm, a vent from said fourth chamber, a valve controlling said vent, means connecting said diaphragms together, and means actuated by said diaphragms for determining the position of said valve with respect to said vent; the position of said valve being determined by the combined effects of the pressure in the several chambers to permit a portion of the fluid pressure to escape from the fourth chamber whereby the effective fluid pressure in said fourth chamber, which is transmitted to the pressure responsive device, is proportional to the negative controlling pressure.

JOHN R. HARTLEY.